(12) United States Patent
Doornenbal et al.

(10) Patent No.: US 10,289,667 B2
(45) Date of Patent: *May 14, 2019

(54) COMPUTER-PROGRAM PRODUCTS AND METHODS FOR ANNOTATING AMBIGUOUS TERMS OF ELECTRONIC TEXT DOCUMENTS

(71) Applicant: Elsevier B.V., Amsterdam (NL)

(72) Inventors: Marius Doornenbal, Meteren (NL); Inga Kohlhof, Berlin (DE)

(73) Assignee: Elsevier B.V., Amsterdam (NL)

( * ) Notice: Subject to any disclaimer, the term of this patent is extended or adjusted under 35 U.S.C. 154(b) by 23 days.

This patent is subject to a terminal disclaimer.

(21) Appl. No.: 15/257,280

(22) Filed: Sep. 6, 2016

(65) Prior Publication Data

US 2016/0378742 A1    Dec. 29, 2016

Related U.S. Application Data

(63) Continuation of application No. 14/080,156, filed on Nov. 14, 2013, now Pat. No. 9,460,091.

(51) Int. Cl.
*G06F 12/04* (2006.01)
*G06F 17/24* (2006.01)
(Continued)

(52) U.S. Cl.
CPC .......... *G06F 17/241* (2013.01); *G06F 17/277* (2013.01); *G06F 17/2775* (2013.01);
(Continued)

(58) Field of Classification Search
CPC ........ G06F 17/24; G06F 17/28; G06F 17/241; G06F 17/271; G06F 17/276–17/277;
(Continued)

(56) References Cited

U.S. PATENT DOCUMENTS 5,872,056 A    2/1999 Liddy et al.
6,006,221 A    12/1999 Liddy et al.
(Continued)

FOREIGN PATENT DOCUMENTS

EP    0597630    7/2002
WO    2012000013    1/2012

*Primary Examiner* — Quoc A Tran
(74) *Attorney, Agent, or Firm* — Dinsmore & Shohl LLP (57) ABSTRACT

Computer-program products and methods for automatically annotating terms, such as ambiguous terms, in an electronic text document are disclosed. In one embodiment, a method of annotating a text document includes determining, by a computing device, a term of interest within the text document. The method further includes searching a data structure including incongruous term pairs ($t_x$, tt) determined from a controlled vocabulary for the term of interest appearing as a term tt, wherein the term tt is a linguistic head of a term $t_x$ of the incongruous term pairs ($t_x$, tt). The method further includes annotating the term of interest with a meaning provided by the controlled vocabulary only if a term $t_x$ of the incongruous term pairs ($t_x$, tt) associated with the term of interest in the data structure is not present within a predetermined textual distance of the term of interest in the text document.

20 Claims, 5 Drawing Sheets (51) Int. Cl.
*G06F 17/27* (2006.01)
*G06F 17/28* (2006.01)
*G06F 17/30* (2006.01)
*G06F 12/0886* (2016.01)
*G06F 17/00* (2019.01)

(52) U.S. Cl.
CPC .... *G06F 17/2785* (2013.01); *G06F 17/30011* (2013.01); *G06F 17/30684* (2013.01); *G06F 12/04* (2013.01); *G06F 12/0886* (2013.01); *G06F 17/24* (2013.01); *G06F 17/276* (2013.01); *G06F 17/2765* (2013.01); *G06F 17/2795* (2013.01); *G06F 17/28* (2013.01); *G06F 17/30616* (2013.01); *G06F 17/30864* (2013.01)

(58) Field of Classification Search
CPC ............. G06F 17/2765; G06F 17/2795; G06F 17/2785; G06F 17/30864; G06F 17/30616; G06F 17/3672
See application file for complete search history.

(56) References Cited

U.S. PATENT DOCUMENTS

| | | | |
|---|---|---|---|
| 7,028,038 | B1 | 4/2006 | Pakhomov |
| 7,464,020 | B1* | 12/2008 | Wong .................... G06F 17/211 704/4 |
| 7,536,619 | B2 | 5/2009 | Seligman et al. |
| 7,555,428 | B1* | 6/2009 | Franz .................... G06F 17/277 704/10 |
| 8,346,534 | B2 | 1/2013 | Csomai et al. |
| 2002/0077816 | A1 | 6/2002 | Shen et al. |
| 2003/0139921 | A1 | 7/2003 | Byrd et al. |
| 2007/0106499 | A1 | 5/2007 | Dahlgren et al. |
| 2009/0204386 | A1 | 8/2009 | Seligman et al. |
| 2010/0010804 | A1 | 1/2010 | Friedman et al. |
| 2010/0235313 | A1 | 9/2010 | Rea et al. |
| 2011/0196670 | A1 | 8/2011 | Dang et al. |
| 2012/0102045 | A1 | 4/2012 | Cucerzan et al. |
| 2013/0151957 | A1* | 6/2013 | Kuroiwa ............. G06F 17/2211 715/256 |
| 2013/0197900 | A1 | 8/2013 | Rotbart et al. |

* cited by examiner

COMPUTER-PROGRAM PRODUCTS AND METHODS FOR ANNOTATING AMBIGUOUS TERMS OF ELECTRONIC TEXT DOCUMENTS

The present application is a continuation of, and claims priority to, U.S. patent application Ser. No. 14/080,156, filed Nov. 14, 2013 entitled COMPUTER-PROGRAM AND METHODS FOR ANNOTATING AMBIGUOUS TERMS OF ELECTRONIC TEXT DOCUMENTS, the contents being hereby incorporated by reference in its entirety.

BACKGROUND

Field

The present specification generally relates to annotating electronic text documents and, more particularly, to discerning the proper meaning of ambiguous terms and annotating those ambiguous terms with the proper meaning by use of a controlled vocabulary structure.

Technical Background

Electronic text documents may be annotated with information. Annotations may be provided in metadata, for example. Markup languages, such as XML, may be utilized to provide additional information regarding an electronic text document beyond the original text. In some cases, an electronic text document is annotated with information regarding the subject matter discussed within the electronic text document.

Words and phrases within electronic text documents are often annotated with meanings as defined by a controlled vocabulary, such as a thesaurus. Such annotations may assist in classifying the electronic text document or otherwise grouping the electronic text document by subject matter. However, the meaning of many terms may be ambiguous because one term may have many different meanings. For example, the term "Hampshire" may mean a breed of swine, and a county in England, among others. Annotating a term in an electronic text document with a meaning of the controlled vocabulary that is not the meaning intended by the electronic text document is problematic. It may be difficult to automatically determine when and how to annotate ambiguous terms within an electronic text document.

Accordingly, a need exists for alternative computer-program products and methods for discerning the proper meaning of ambiguous terms and annotating those ambiguous terms with the proper meaning.

SUMMARY

In one embodiment, a method of annotating a text document includes determining, by a computing device, a term of interest within the text document. The method further includes searching a data structure including incongruous term pairs ($t_x$, tt) determined from a controlled vocabulary for the term of interest appearing as a term tt, wherein the term tt is a linguistic head of a term $t_x$ of the incongruous term pairs ($t_x$, tt). The method further includes annotating the term of interest with a meaning provided by the controlled vocabulary only if a term $t_x$ associated with the term of interest in the data structure is not present within a predetermined textual distance of the term of interest in the text document.

In another embodiment, a computer-program product includes a computer-readable medium storing executable instructions that, when executed by a computing device, causes the computing device to determine a term of interest within a text document, and search a data structure including incongruous term pairs ($t_x$, tt) determined from a controlled vocabulary for the term of interest appearing as a term tt, wherein the term tt is a linguistic head of a term $t_x$ of the incongruous term pairs ($t_x$, tt). The executable instructions further cause the computing device to annotate the term of interest with a meaning provided by the controlled vocabulary only if a term $t_x$ associated with the term of interest in the data structure is not present within a predetermined textual distance of the term of interest in the text document.

In yet another embodiment, a method of annotating a text document includes determining, by a computing device, a plurality of ambiguous terms in a controlled vocabulary. The method further includes, for one or more ambiguous terms found in the controlled vocabulary, determining term pairs ($t_x$, tt) containing the one or more ambiguous terms as target term tt, wherein terms $t_x$ are semantic context terms, and searching the text document for the plurality of ambiguous terms. The method further includes, for each ambiguous term that is found in the text document, determining if a semantic context term $t_x$ of the term pairs ($t_x$, tt) wherein the target term tt is the found ambiguous term is within a predetermined textual distance of the found ambiguous term in the text document. The ambiguous term is annotated with a meaning of the target term tt as provided in the controlled vocabulary only if a semantic context term $t_x$ of the term pairs ($t_x$, tt) where the target term tt is the found ambiguous term is present within the predetermined textual distance of the found ambiguous term in the text document.

In yet another embodiment, a method of determining incongruous term pairs within a controlled vocabulary includes determining a plurality of compound noun phrases within the controlled vocabulary, wherein each compound noun phrase includes a first term and a second term, wherein the second term is a linguistic head of the first term. The method further includes for each compound noun phrase of the plurality of compound noun phrases, determining, by a computing device, a semantic distance between the second term and the first term, and, for each compound noun phrase wherein the semantic distance between the second term and the first term is greater than a threshold distance, saving the compound noun phrase in a data structure as an incongruous term pair ($t_x$, tt), wherein the second term is term tt and the first term is $t_x$.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to methods and computer-program products for determining when and how ambiguous terms present within an electronic text document should be annotated with a meaning as provided in a controlled vocabulary. Generally, embodiments described herein may determine whether or not a term that is present in an electronic text document is an ambiguous term. If a term is found to be ambiguous, the structure of the controlled vocabulary (e.g., a thesaurus, an index, and the like) may be exploited to determine if and/or how the ambiguous term should be annotated.

More specifically, in some embodiments, ambiguous words are determined by automatically detecting terms that do not have the same meaning used in the electronic text document as intended by the controlled vocabulary. When executing the task of detecting the usage of terms defined by the controlled vocabulary in a given electronic text document, the methods and computer-program products described herein may determine the situations where the simple term reference points to a meaning that is not the intended meaning of the controlled vocabulary to establish that the term has another meaning. A term having a meaning in the electronic text document that is different than the meaning intended by the controlled vocabulary is therefore not annotated with the meanings as provided by the controlled vocabulary. As a non-limiting example, the term "data mining" may not be a type of "mining" as intended by the controlled vocabulary. In such a case, the term "mining," which may be considered ambiguous, would not be annotated with the meaning of "mining" provided by the controlled vocabulary. As described in more detail below, embodiments utilize the structure of the controlled vocabulary to assist in making the determination of whether or not a particular ambiguous term should be annotated with the meaning provided by the controlled vocabulary.

In other embodiments, the structure of the controlled vocabulary is exploited to automatically determine the meaning of ambiguous terms. Rather than, or in addition to, determining ambiguous terms that should not be annotated as described above, some embodiments may determine the situations where the simple term reference does point to a meaning that is the intended meaning of the controlled vocabulary. Generally, embodiments may use the structure of the controlled vocabulary to compare the semantic context of the ambiguous term in the controlled vocabulary with the textual context of the ambiguous term in the electronic text document. If context terms that are closely related to the ambiguous term as provided by the structure of the controlled vocabulary are found in proximity to the ambiguous term in the electronic text document, the ambiguous term may be annotated with the meaning of the term as defined by the controlled vocabulary.

As a non-limiting example, the term Hampshire may have many different meanings within a controlled vocabulary and therefore be ambiguous. One of the meanings of the term "Hampshire" in the controlled vocabulary may be a breed of swine, while another meaning may be the geographic location of Hampshire, England. Embodiments may detect context words in that appear in close proximity to Hampshire in the electronic text document, such as "pig" or "swine," that are closely related to the term "Hampshire" in the controlled vocabulary that has the meaning of a breed of swine. If those context terms are present, the ambiguous term "Hampshire" may be annotated accordingly.

Various embodiments of annotating electronic text documents by evaluating ambiguous terms using a controlled vocabulary are described in detail below.

The computer-program products and methods described herein may be utilized to annotate any type of electronic text document, including, but not limited to, patent documents, legal documents, agricultural documents, scientific research documents, news articles, and journals. The phrase "controlled vocabulary" means any data structure wherein terms and phrases are organized. Example controlled vocabularies include, but are not limited to, thesauri, taxonomies, and subject indexes.

Figure 1:
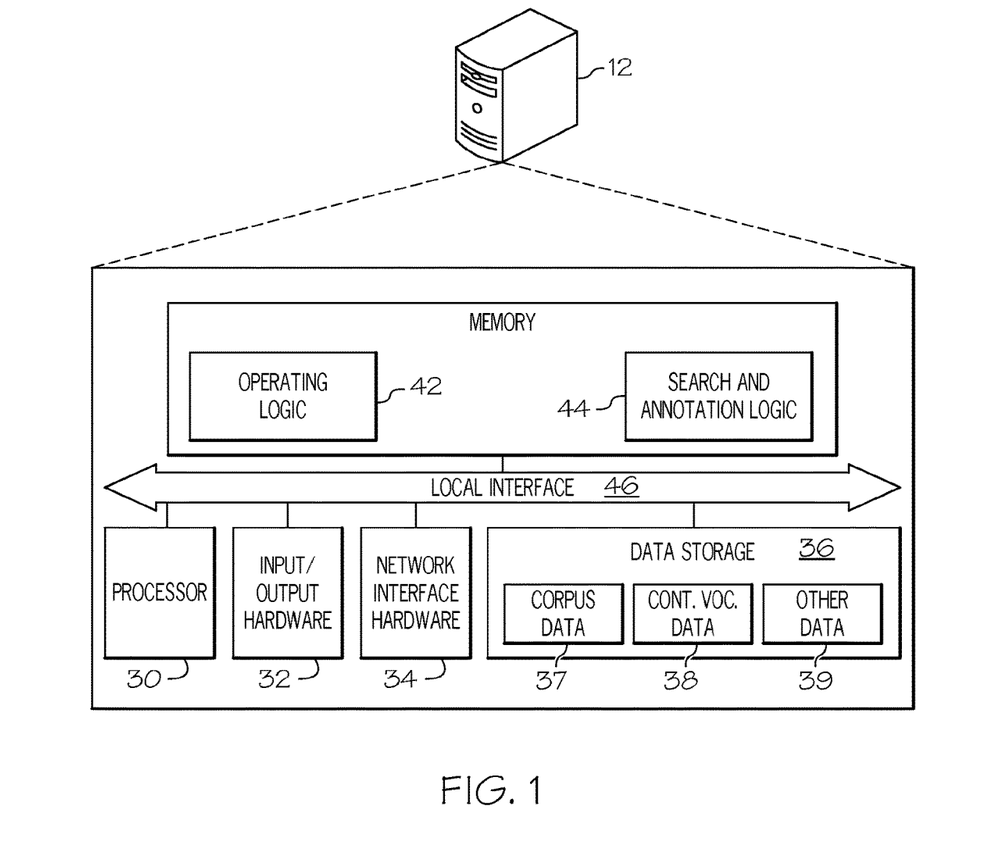
FIG. 1 depicts a schematic illustration of a computing device illustrating hardware and software that may be utilized to annotate terms within an electronic text document according to one or more embodiments shown and described herein.

FIG. 1 depicts a computing device 12 illustrating a computer-implemented system for annotating electronic text documents by evaluating ambiguous terms using a controlled vocabulary, and/or a non-transitory computer-readable medium for annotating electronic text documents by evaluating ambiguous terms using a controlled vocabulary, software, and/or firmware, according to embodiments shown and described herein. While in some embodiments, the computing device 12 may be configured as a general purpose computer with the requisite hardware, software, and/or firmware, in some embodiments, the computing device 12 may be configured as a special purpose computer designed specifically for performing the functionality described herein. The computing device 12 may be configured as any computing device, such as, but not limited to, a desktop computer, a laptop computer, a tablet computer, and a smart phone. Although FIG. 1 depicts an embodiment wherein the described computer-implemented method is performed by a single computing device, embodiments are not limited thereto. For example, embodiments may be configured as networked computing devices, such that any number of computing devices may be communicatively coupled to perform the methods described herein in a distributed computing manner.

As also illustrated in FIG. 1, the computing device 12 may include a processor 30, input/output hardware 32, network interface hardware 34, a data storage component 36 (which may store corpus data 37, controlled vocabulary data 38, and other data 39), and a non-transitory memory component 40. The memory component 40 may be configured as volatile and/or nonvolatile computer-readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42 and search and annotation logic 44 (each of which may be embodied as a computer program, firmware, or hardware, as an example). A local interface 46 is also illustrated in FIG. 1 and may be implemented as a bus or other interface to facilitate communication among the components of the computing device 12.

The processor 30 may include any processing component(s) configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the computing device 12, and may be configured to store one or more pieces of data for access by the computing device 12 and/or other components. As illustrated in FIG. 1, the data storage component 36 may store corpus data 37, which includes a plurality of electronic text documents. The electronic text documents may include, but are not limited to, scientific journals, agricultural documents, news articles, and patent documents. The corpus data 37 may be stored in one or more data storage devices either internal or external to the computing device. In some embodiments, the electronic text documents may be configured as marked-up electronic documents that have been annotated by a mark-up language, such as XML, for example.

The controlled vocabulary data 38 includes data associated with one or more controlled vocabularies. One or more controlled vocabularies may be utilized for each document corpus. For example, a first controlled vocabulary may be used for a first document corpus containing documents relevant to physics. Any controlled vocabulary may be utilized depending on the topic of the documents stored in the document corpus. Exemplary controlled vocabularies may include, but are not limited to, Compendex, Medical Subject Headings ("MeSH"), National Agricultural Library agricultural thesaurus ("NAL"), as well as custom thesauri or indices. Controlled vocabularies are described in more detail below with respect to FIG. 2.

Similarly, the controlled vocabulary data 38 may be stored by the data storage component 36 local to the computing device or stored remotely from the computing device 12 (e.g., an external storage device, a networked computer, or a remote server). Other data 39 may be stored in the data storage component 36 and may include a data structure(s) in which the annotations described herein are provided and accessed. The other data 39 may also provide support for functionalities described herein (e.g., metadata that may be utilized in conjunction with the corpus data and/or the controlled vocabulary data 38).

Included in the memory component 40 are the operating logic 42 and the search and annotation logic 44. The operating logic 42 may include an operating system and/or other software for managing components of the computing device 12. The search and annotation logic 44 may be configured as computer readable instructions that provide for the search of both the electronic text documents and controlled vocabularies to perform the functionality described herein, such as determining ambiguous terms and determining whether or not and how such ambiguous terms should be annotated.

It should be understood that the components illustrated in FIG. 1 are merely exemplary and are not intended to limit the scope of this disclosure. More specifically, while the components in FIG. 1 are illustrated as residing within the computing device 12, this is a nonlimiting example. In some embodiments, one or more of the components may reside external to the computing device 12. Similarly, while FIG. 1 is directed to the computing device 12, other components may include similar hardware, software, and/or firmware. The processor 30, memory component 40 and search and annotation logic 44 may define a computer-program product for determining ambiguous terms and determining whether or not and how such ambiguous terms should be annotated.

As stated above, terms that appear within a controlled vocabulary, such as a thesaurus, may be ambiguous because there may be more than one meaning attributed to such terms. Further, terms may be ambiguous because it may be common for terms to be used in a manner such that the term has a meaning that is different from the intended meaning of the controlled vocabulary. Embodiments of the present disclosure utilize the structure of the controlled vocabulary to determine whether or not a term is ambiguous, and if so, whether or not the ambiguous term should be annotated.

Compound noun phrases are phrases that include two or more words and include a head term and a modifier. As an example and not a limitation, the phrase "data mining" is a compound noun phrase wherein "mining" is the head term and "data" is the modifier. Compound noun phrases may include more than two words. As another non-limiting example, the phrase "scanning electron microscopy" is a compound noun phrase having multiple modifiers and multiple head terms. "Scanning electron" is a modifier that modifies the head term "microscopy." Further, "scanning" is a modifier that modifies the head term "electron microscopy." It is noted that compound noun phrases are referred to herein as having a "first term" and "second term." However, no particular order is intended by the use of "first" and "second." Further, compound noun phrases may have more than two words or terms.

Figure 2:
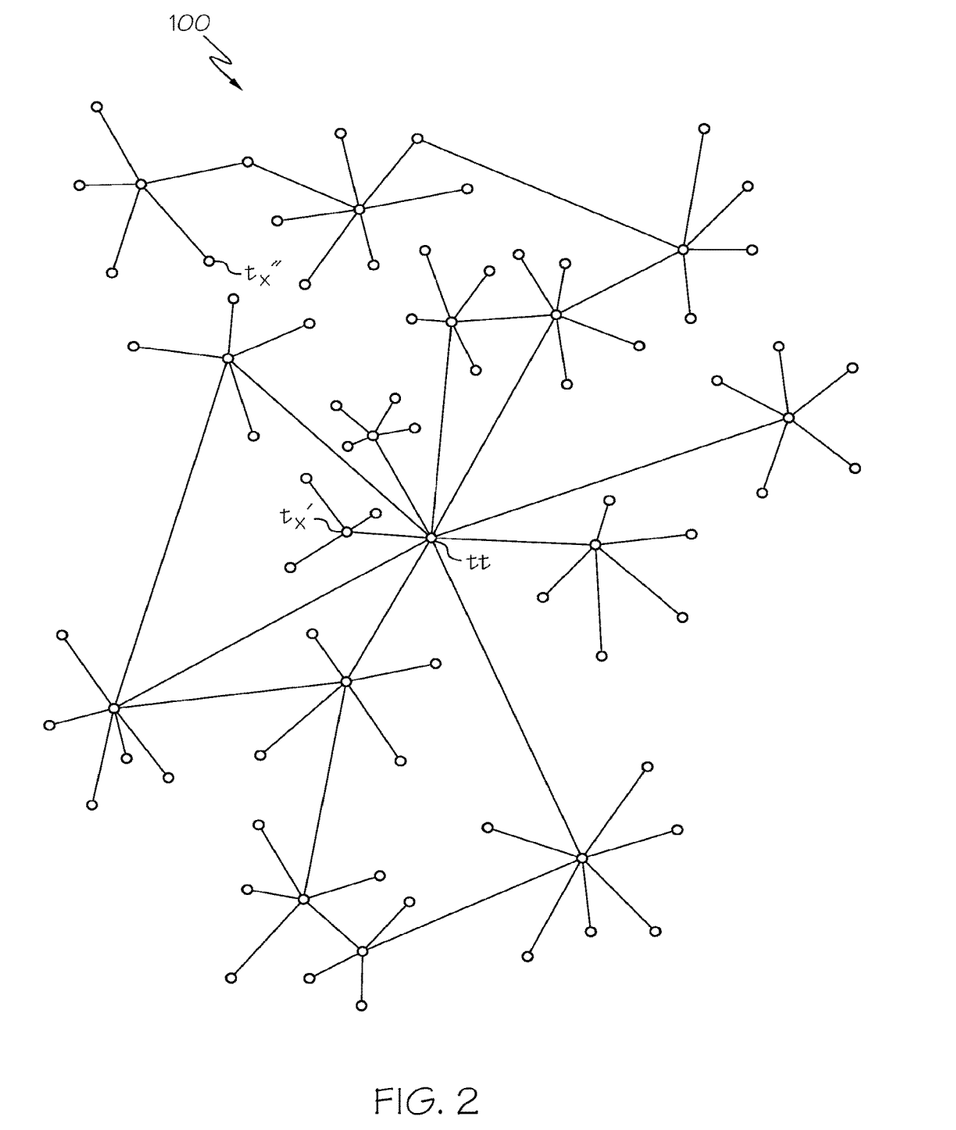
FIG. 2 depicts a graphical representation of an example semantic network defined by a controlled vocabulary.

Controlled vocabularies, such as thesauri, often organize terms by semantic inheritance relationships. As another example, compound noun phrases (i.e., a phrase having a head term and a modifier) are often organized by a common head term. Further, the controlled vocabulary may have other defined relationships between terms, such as by related terms. Accordingly, related concepts are clustered together. Such controlled vocabularies may define a semantic network. The semantic network may be visualized graphically. FIG. 2 is an illustrative example of a graph 100 partially depicting a semantic network defined by a controlled vocabulary. It should be understood that the graph 100 depicted in FIG. 2 is for illustrative purposes only, and that embodiments are not limited thereto. The structure of the example graph 100 is such that all terms are plotted as vertices (depicted as circles in the graph 100) with edges connecting them (depicted as lines connecting the vertices in the graph 100). Edges depict a relationship between terms within the controlled vocabulary, such as broader/narrower term relationships or other relationships defined by the particular controlled vocabulary. The "semantic distance" between terms within the controlled vocabulary is defined as the number of edges it takes to navigate from a first term (e.g., term tt) to a second term (e.g., term $t_x'$). For example, the semantic distance between term tt and term $t_x'$ is one, while the semantic distance between term tt and term $t_x''$ is seven.

Oftentimes a linguistic relationship between child terms and parent terms parallels the hierarchical relationship of the controlled vocabulary. For example, the relationship between "coal mining" and "mining" is such that "mining" is a general term (i.e., the parent term) that subsumes specific terms, such as "coal mining" and "copper mining."

The design of the controlled vocabulary expresses this fact: by definition, a parent (broader term) concept subsumes its "child" concepts (narrower terms). In view of this parallelism, the present inventors define two concepts: linguistic inheritance and semantic inheritance.

Linguistic inheritance occurs when the linguistic, syntactic head of a phrase is the linguistic parent. Examples include "mining" and "coal mining," "mining" and "data mining," and "migration" and "cell migration." In the above-referenced examples, "mining" is the linguistic parent of "coal mining" and "data mining," while "migration" is the linguistic parent of "cell migration."

Semantic inheritance is defined by the controlled vocabulary wherein broad terms (parents) are semantically linked to narrower terms (children). Using the examples introduced above, the term "mining" is also the semantic parent to "coal mining" and "copper mining" in addition to being a linguist parent as described above.

However, discrepancies exist between the linguistic and semantic inheritance lines. For example, the phrase "data mining" may not be a type of mining in the sense defined by the controlled vocabulary. In this example, the term "mining" is used metaphorically. The semantic parent for "data mining" may be "computational process" or "computer science," for example, while the linguistic parent is "mining." Therefore, there is a discrepancy between the semantic parent and the linguistic parent, unlike the "mining" and "coal mining" example provided above.

Phrases may be formulated as a term pair comprising a term tt that is a linguistic head of a term $t_x$. Term $t_x$ may be a linguistic derivative of term tt (e.g., "coal mining" ($t_x$) is linguistically a derivative of mining (tt)). Term pairs having a linguistic and semantic discrepancy may be defined as incongruous term pairs comprising term tt and term $t_x$. As used herein "incongruous term pairs" are term pairs wherein tt is a linguistic head of $t_x$, and the semantic distance between $t_x$ and tt is greater than a threshold distance. The threshold distance that is chosen may depend on the particular controlled vocabulary that is utilized or by other considerations. It should be understood that embodiments of the present disclosure are not limited to any particular threshold distance.

Referring once again to FIG. 2, the semantic distance between head term tt and term $t_x'$ is one, while the semantic distance between head term tt and term $t_x''$ is seven. According to the metrics described above, if the threshold distance is six, term pair ($t_x''$, tt) would be considered an incongruous term pair.

As described in more detail below, embodiments of the present disclosure exploit such discrepancies between the linguistic inheritance and the semantic inheritance to determine whether or not a term should be annotated with the meaning as defined by the controlled vocabulary. Generally, embodiments of the present disclosure determine if any terms $t_x$ of incongruous term pairs ($t_x$, tt) appear within a predetermined textual distance of a term of interest appearing as head term tt within an electronic text document. A term of interest may be a head of a compound noun phrase within the electronic text document and/or a term that is a known ambiguous word according to some metric determining ambiguity. More specifically, if a term of interest appears as a term tt of one or more incongruous term pairs ($t_x$, tt), and at least one of the terms $t_x$ of the one or more incongruous term pairs ($t_x$, tt) appears within proximity to the term of interest in the electronic text document, then the term of interest is not annotated with the meaning of the term of interest as defined by the controlled vocabulary.

For example, if the term of interest tt within an electronic text document is "mining" (tt), a modified term $t_x$ is "data mining" (e.g., term $t_x''$ in FIG. 2) with modifier "data," and the threshold distance is six, then the term pair is an incongruous term pair (e.g., ($t_x''$, tt)). If the term "data mining" ($t_x''$) appears within a predetermined textual distance of "mining" (tt) then the term of interest "mining" is not annotated with the meaning of mining as defined by the controlled vocabulary. As an example, the intended meaning of "mining" provided by the controlled vocabulary may be related to extracting natural resources from the earth. As such, annotating "mining" with such a meaning when used in context with "data mining" or computational processes would be inappropriate.

It is noted that the annotation of terms within the electronic text document may take on many forms, and, as such, embodiments are not limited to the output of the computer-implemented methods described herein. For example, in some embodiments, the output (i.e., annotation information) may be written to a data structure that is separate from the electronic text document under evaluation. The data structure may be, for example, a table or a database that stores all of the annotation information regarding a plurality of electronic text documents. In other embodiments, the annotations may be provided in a marked-up electronic text document using a mark-up language, such as XML, for example. Other outputs for the annotations are also possible.

Figure 3:
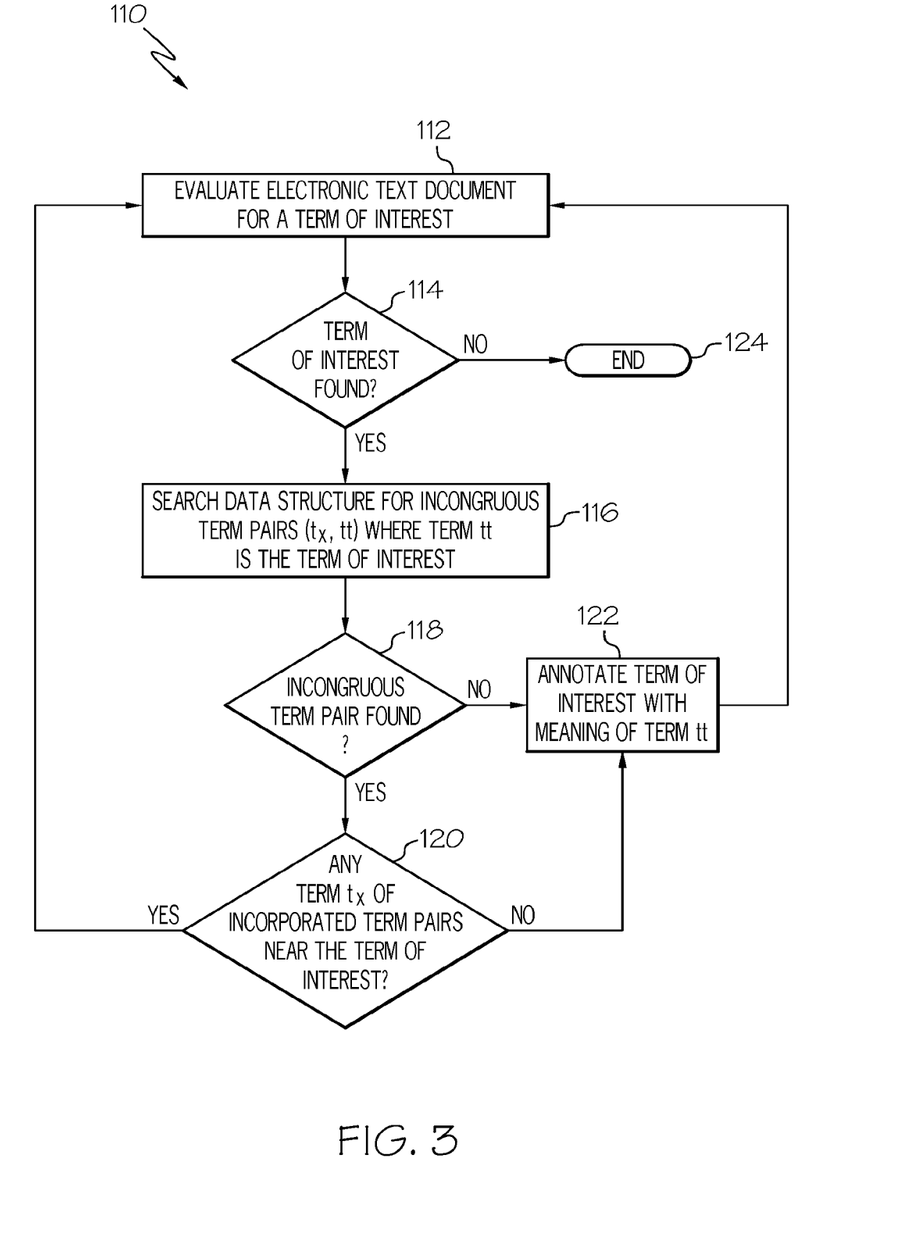
FIG. 3 depicts a flowchart of an example process for annotating a term of interest in an electronic text document based on incongruous term pairs according to one or more embodiments shown and described herein.

An example process of a computer-implemented method of automatically annotating electronic text documents only when a term $t_x$ of an incongruous term pair ($t_x$, tt) is not in proximity to a term of interest acting as a term tt of the incongruous term pair ($t_x$, tt) is depicted in the flowchart 110 of FIG. 3. It should be understood that embodiments are not limited to the process blocks and order of the process blocks depicted in the flowchart 110.

In the example embodiment, an electronic text document is evaluated for a term of interest at block 112. The term of interest may be, for example, a head term of a compound noun phrase, a known ambiguous word, or a term meeting other predetermined criteria. In one embodiment, known ambiguous words are words that have scope notes associated with them in the controlled vocabulary. In many controlled vocabularies, words having multiple meanings have scope notes associated with them to limit the meaning of the term. As an example and not a limitation, the word Pluto may have the following scope notes associate therewith: "Pluto (dwarf planet)," "Pluto (mythology)," and "Pluto (animated character)." In some embodiments, all terms having a scope note associate therewith are extracted from the controlled vocabulary and stored in a data structure as known ambiguous words. Such known ambiguous words may be used to scan or otherwise evaluate an electronic text document to determine if a term of interest is within the electronic text document.

If no term of interest is found at block 114, the process ends at block 124. However, if a term if interest is found at block 114, the process moves to block 116. At block 116 a data structure storing a plurality of incongruous term pairs ($t_x$, tt) is searched to determine if any of the incongruous term pairs ($t_x$, tt) have the term of interest that was found at blocks 112 and 114 as a term tt. The incongruous term pairs ($t_x$, tt) may be term pairs within the controlled vocabulary that meet the criteria described above. It is noted that generation of the data structure storing incongruous term pairs ($t_x$, tt) is described in more detail below with reference to FIG. 4.

If the term of interest does not appear within an incongruous term pair ($t_x$, tt) as term tt at block 118, then the process moves to block 122. Because the term of interest is not associated with any incongruous term pair ($t_x$, tt), the term of interest may be annotated with the meaning as intended by the controlled vocabulary at block 122. Using the "coal mining" example above, this phrase is not an incongruous term pair and therefore "mining" may be annotated with the meaning as defined by the controlled vocabulary. As described above, the annotation of the term of interest may be stored in a data structure separate from the electronic text document, within metadata of the electronic text document (e.g., by XML), or by other means.

However, if the term of interest does appear within an incongruous term pair ($t_x$, tt) at block 118, then the process moves to block 120 where it is determined if any term $t_x$ of the one or more incongruous term pairs ($t_x$, tt) wherein the term of interest is term tt is near the term of interest in the electronic text document. A predetermined textual distance may be applied to determine if a term $t_x$ is near the term of interest. As an example and not a limitation, the predetermined textual distance may be less than one hundred and fifty characters. It should be understood that other values may be chosen for the predetermined textual distance. In some embodiments, the predetermined textual distance may be variable.

If no term $t_x$ is found at block 120, then the process moves to block 122 where the term of interest is annotated as described above. In this case, although the term of interest appears as a term tt in at least one incongruous term pair ($t_x$, tt), no term $t_x$ is present in close proximity to the term of interest in the electronic text document. The process then returns to block 112 so that additional terms of interest may be found and evaluated.

However, if a term $t_x$ is found at block 120 (i.e., a term $t_x$ of an incongruous term pair ($t_x$, tt)), the process moves back to block 112 to search for another term of interest without annotating the meaning of the term of interest with the meaning intended by the controlled vocabulary. Using the "data mining" example from above, this phrase may be stored as an incongruous term pair ($t_x$, tt) in the data structure. Further, the term "data" ($t_x$) may appear in the electronic text document within the predetermined threshold distance from "mining" (tt). Accordingly, the term of interest "mining" would not be annotated with the intended meaning of the controlled vocabulary (e.g., natural resource extraction).

Embodiments are not limited to the process flow depicted in the flowchart 110 of FIG. 3. As a nonlimiting example, all of the terms of interest may be determined initially (e.g., at block 112), and then each found term of interest evaluated in turn for incongruous term pairs ($t_x$, tt) and terms $t_x$ in proximity to the term of interest in the electronic text document.

Figure 4:
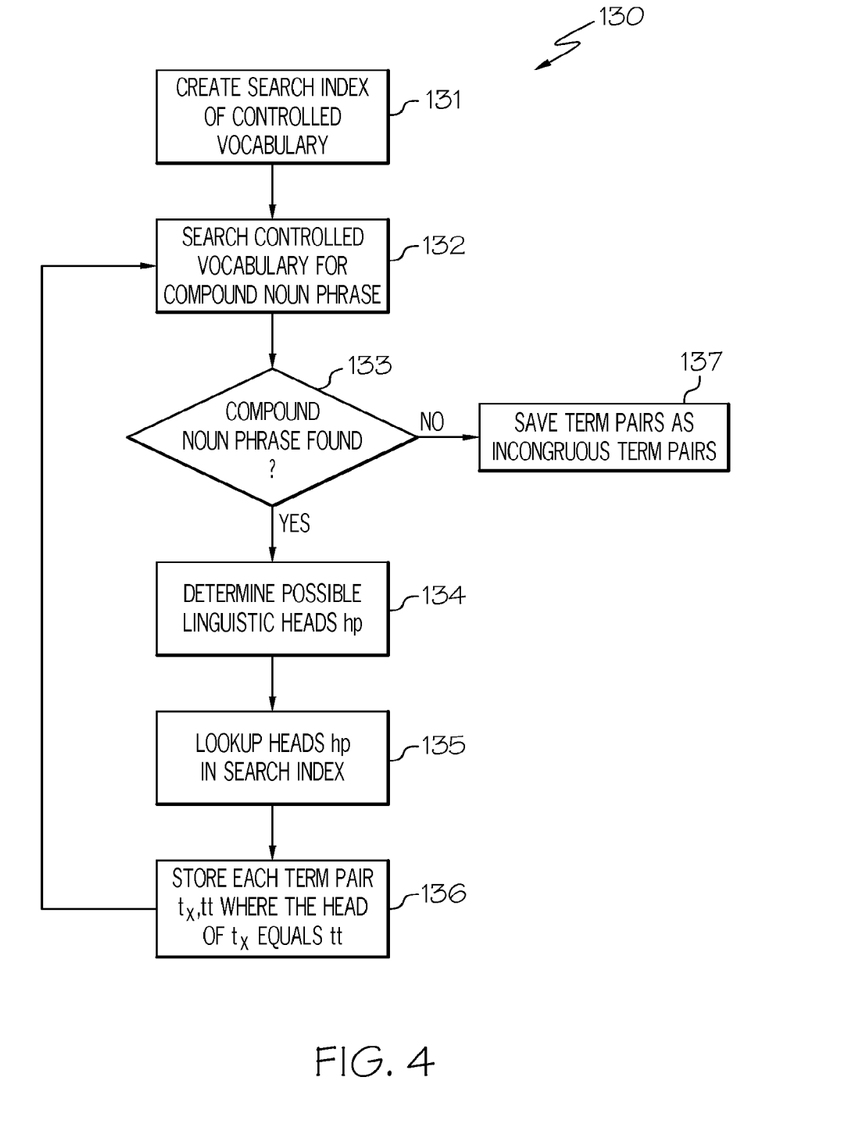
FIG. 4 depicts a flowchart of an example process for generating, from a controlled vocabulary, a data structure comprising incongruous text pairs according to one or more embodiments shown and described herein.

Referring now to FIG. 4, an example process for automatically determining and storing incongruous term pairs ($t_x$, tt) is depicted in a flowchart 130. At block 131, a search index of one or more controlled vocabularies is created and stored in a data structure. Generally, the controlled vocabulary is rearranged such that it is in a searchable form. For example, the phrases stored within the controlled vocabulary may be normalized and sorted in the search index for later retrieval. In some embodiments, the controlled vocabulary may be in a searchable form so that it is not necessary to create a search index.

Next, at block 132, compound noun phrases in the controlled vocabulary are determined. As stated above, a compound noun phrase is a phrase comprising a head and a modifier. If a compound noun phrase is found at block 133, the process moves to block 134 where the found compound noun phrase is evaluated.

At block 134, possible linguistic heads $h_p$ of the compound noun phrase are determined. Any known or yet-to-be-developed means for determining linguistic heads $h_p$ of the compound noun phrase may be utilized. As an example and not a limitation, the compound noun phrase that was found at blocks 132 and 133 may be "scanning electron microscopy." This example compound noun phrase has three linguistic heads $h_p$: 1) "microscopy" (modified by "scanning electron"), 2) "electron microscopy" (modified by "scanning"), and 3) "scanning microscopy" (modified by "electron"). Each one of these linguistic heads $h_p$ may be determined at block 134.

Next, at block 135, each linguistic head $h_p$ determined at block 134 are looked up in the search index that was created at block 131 (or looked up in the controlled vocabulary if no search index is created). Term pairs ($t_x$, tt) are created and stored in a data structure at block 136. The term pairs are defined by term $t_x$, which is the compound noun phrase under scrutiny (e.g., "scanning electron microscopy"), and terms tt, which is/are the linguistic heads $h_p$ that were found in the search index in block 135 and where a head of $t_x$ is equal to tt. Referring to the "scanning electron microscopy" example, term pairs ($t_x$, tt) that may be created and stored at block 136 include ("scanning electron microscopy", "microscopy"), ("scanning electron microscopy", "electron microscopy"), and ("scanning electron microscopy", "scanning microscopy").

The process continues back to block 132 where the controlled vocabulary is searched for another compound noun phrase. The process may be repeated until no more compound noun phrases are found at block 133. In this manner, term pairs ($t_x$, tt) for the compound noun phrases in the controlled vocabulary may be created and stored.

When no more compound noun phrases are found, the process moves to block 137, where incongruous term pairs ($t_x$, tt) are determined from the term pairs ($t_x$, tt) that are stored in the data structure. In embodiments, the incongruous term pairs ($t_x$, tt) are determined by evaluating the semantic distance between term $t_x$ and term tt of each term pair ($t_x$, tt) stored in the data structure. As stated above, incongruous term pairs are term pairs wherein tt is a linguistic head of $t_x$, and the semantic distance between $t_x$ and tt in the controlled vocabulary is greater than a threshold distance. The threshold distance that is chosen may depend on the particular controlled vocabulary that is utilized or by other considerations. As a non-limiting example, the threshold distance may be six. It should be understood that embodiments of the present disclosure are not limited to any particular threshold distance. Accordingly, all term pairs ($t_x$, tt) wherein the semantic distance between term $t_x$ and term tt is greater than a threshold distance are saved in a data structure as incongruous term pairs ($t_x$, tt).

It should be understood that embodiments are not limited to the process flow depicted in FIG. 4. For example, in some embodiments, all of the compound noun phrases may be determined (e.g., block 132) in one scan, and then each found compound noun phrase may be evaluated to generate incongruous term pairs ($t_x$, tt).

The data structure storing the incongruous term pairs ($t_x$, tt) may be accessed to determine whether or not a term of interest should be annotated with the intended meaning of the controlled vocabulary as described above.

Rather than preventing annotation of terms within an electronic document based on surrounding context terms as described above, embodiments of the present disclosure may annotate terms of interest only when certain context terms are present within the electronic text document. Such embodiments rely on term pairs ($t_x$, tt) having a semantic relationship in the electronic text document that corresponds with a semantic relationship within the controlled vocabulary, which is in contrast to the incongruous term pairs as described above. Embodiments described below will annotate an ambiguous term only if semantic context terms $t_x$ are in close proximity to the ambiguous term.

Figure 5:
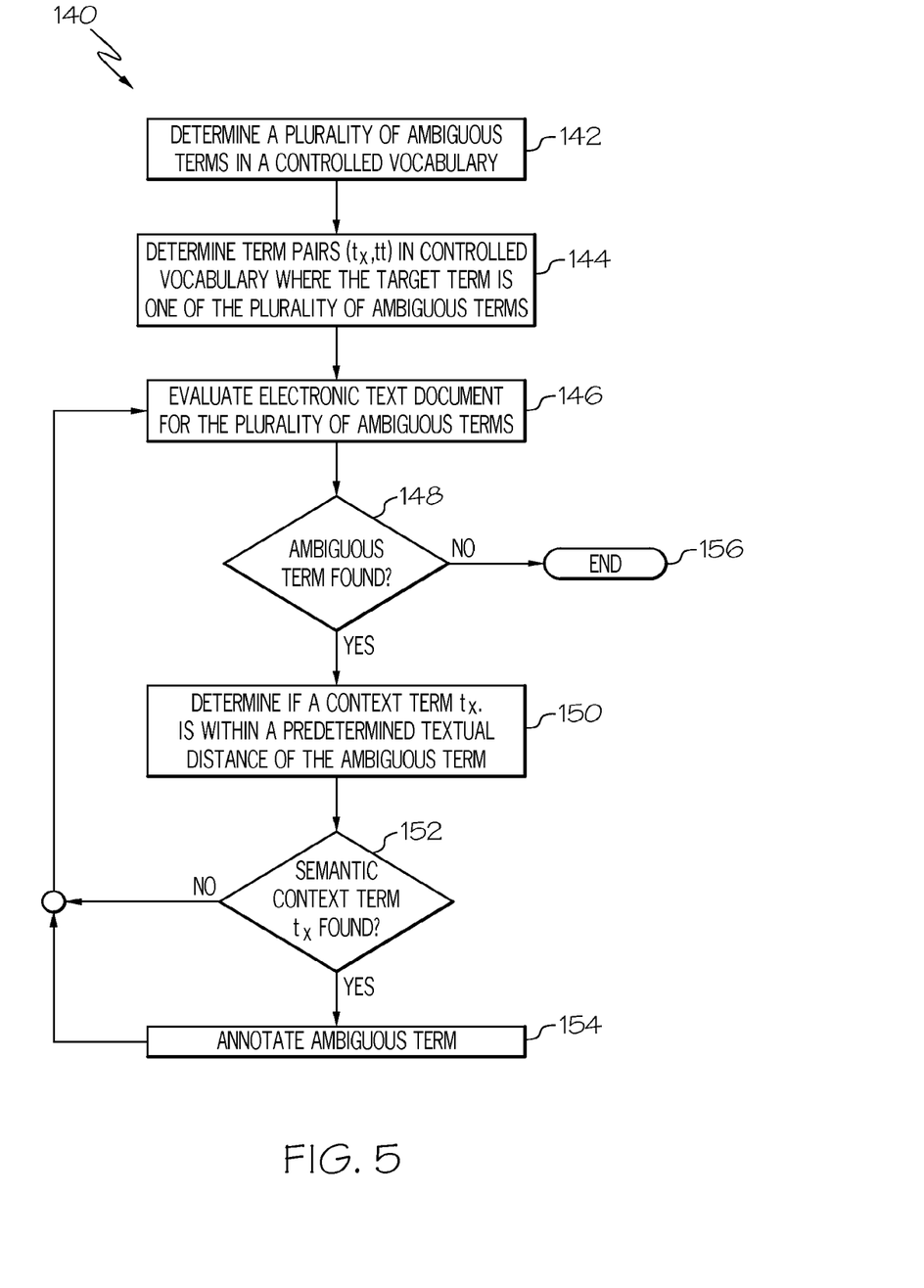
FIG. 5 depicts a flowchart of an example process for annotating an ambiguous term in an electronic text document based on a structure of a controlled vocabulary according to one or more embodiments shown and described herein.

FIG. 5 depicts a flowchart 140 illustrating an example process of automatically annotating an ambiguous term of an electronic text document with an intended meaning of a controlled vocabulary according to one embodiment. It should be understood that embodiments are not limited to the process blocks and the process order depicted in FIG. 5. At block 142, a plurality of ambiguous terms in a controlled vocabulary are determined. For example, the ambiguous terms may be determined by determining terms within the controlled vocabulary that have one or more scope notes associated therewith, as described above. Each term within the controlled vocabulary that has a scope note may be stored in a data structure. The ambiguous terms may be pre-processed or performed in real time according to embodiments.

At block 144 the controlled vocabulary is evaluated to determine term pairs ($t_x$, tt) comprising a semantic context term $t_x$ and a target term tt wherein the target term tt is one of the ambiguous terms that were found at block 142. Accordingly, the controlled vocabulary may be searched to find ambiguous words that appear within term pairs ($t_x$, tt) as a target term tt. In some embodiments, the term pairs ($t_x$, tt) are extracted and stored in a data structure (e.g., the data structure storing the ambiguous words or another data structure) for later retrieval.

Term pairs ($t_x$, tt) are pairs of terms that have some relationship as defined by the controlled vocabulary. Such relationships include, but are not limited to, parent, child, sibling, related term, parent/child siblings of related terms, etc. As a further example, relationships between terms may also be derived from relationships between a base term and its scope note. For example, the entry "Hampshire" (swine breed) may be interpreted as a base term "Hampshire." The base term may then be exploited with respect to "swine breed," which may also have its own entry in the controlled vocabulary. Term pairs ($t_x$, tt) are made of a semantic context term $t_x$ and a target term tt that are closely connected in the semantic network as defined by the controlled vocabulary (e.g., connected by a single edge as shown in FIG. 2). At block 142, therefore, term pairs ($t_x$, tt) having an ambiguous term as the target term tt are determined and may be stored.

Next, at block 146, an electronic text document is evaluated to determine if it contains any of the ambiguous words that were determined at block 142. If no ambiguous term is found in the electronic text document at block 148, then the process ends at block 156 without annotation of the ambiguous term in the electronic text document. However, if an ambiguous term is found, the process moves to block 150.

At block 150, the electronic text document is evaluated to determine if any semantic context terms $t_x$ of the term pairs ($t_x$, tt) wherein the target term tt is the ambiguous term are in close proximity to the ambiguous term in the text of the electronic text document. Proximity may be established by a predetermined textual distance. It should be understood that embodiments are not limited by any predetermined textual distance value. As an example and not a limitation, the predetermined textual distance may be within one hundred characters of the ambiguous term in the text of the electronic text document. Semantic context terms $t_x$ that are in close proximity to the ambiguous term indicate that the meaning of the ambiguous term intended by the electronic text document matches the meaning intended by the controlled vocabulary. Therefore, if no semantic context terms $t_x$ are within the predetermined textual distance of the ambiguous term in the electronic text document at block 152, the process moves back to block 146 without annotation of the ambiguous term. Another ambiguous term may be found at blocks 146 and 148.

However, if one or more semantic context terms $t_x$ are found at block 152, the process moves to block 154 where the ambiguous term is annotated with the meaning of the ambiguous word as provided by the controlled vocabulary. As stated above, the annotation may be provided in a data structure separate from the electronic text document or within the electronic text document itself. The process then moves back to block 146 until no more ambiguous terms are found in the electronic text document.

It should be understood that in other embodiments, all of the ambiguous terms are found in one scan (e.g., at block 146), and then each ambiguous term may be evaluated in turn for semantic context terms.

As a non-limiting example, consider that the word "Hampshire" contains scope notes within the controlled vocabulary. The scope notes may indicate that one meaning of Hampshire is for a breed of swine, while another meaning is a county in England. Other meanings for the word "Hampshire" may also be provided by other scope notes. Because "Hampshire" has scope notes, it is saved or otherwise indicated as an ambiguous term among other ambiguous words that are stored in a data structure. The controlled vocabulary is accessed to generate a plurality of term pairs ($t_x$, tt) based on the relationship of "Hampshire" to other terms within the controlled vocabulary.

Referring to FIG. 2, for example, the vertices labeled tt may be the term Hampshire, and all terms directly linked to it may be stored as a semantic context term $t_x$ (e.g., term $t_x'$ in FIG. 2) to generated semantic term pairs ($t_x$, tt). For example, semantic context terms $t_x$ that share a relationship with the word Hampshire may include "swine" and "pig," among others. It is noted that other instances of Hampshire with different meanings may also be present in the semantic network defined by the controlled vocabulary. For example, another instance of "Hampshire" may have semantic context terms $t_x$ such as "England," and "United Kingdom" associated therewith.

Next, an electronic text document may be analyzed to determine how to annotate ambiguous words. The electronic text document may be scanned to find such ambiguous words. Using the above example, the word "Hampshire" may be encountered during a scan of the electronic text document. Because "Hampshire" appears in the data structure containing ambiguous words, it is then further evaluated to determine if semantic context terms are located in the electronic text document within a predetermined textual distance from the word "Hampshire." For example, if the semantic context word "swine" or "pig" appears within the predetermined textual distance of "Hampshire" in the text of the electronic text document, then "Hampshire" is annotated with the proper intended meaning of the controlled vocabulary (e.g., breed of swine). However, if no semantic context term is found within the predetermined textual distance of "Hampshire," then the word is not annotated.

It is noted that the embodiments depicted in FIG. 3 and FIG. 5 may be utilized in conjunction with one another. For example, a term of interest may first be evaluated by searching for terms of incongruous term pairs and, if none are found, then evaluating the term of interest to see if there are semantic context terms in proximity to the term of interest to determine if it should be annotated.

It should be understood that embodiments described herein provide for annotation of terms of interest based on the structure of a controlled vocabulary. Embodiments may determine if certain terms are ambiguous and, if so, evaluate both the structure of the controlled vocabulary and the electronic text document to determine if and how such terms should be annotated with the meaning of the controlled vocabulary.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of annotating a text document, the method comprising:
   determining, by a computing device, a term of interest within the text document;
   searching a data structure storing incongruous term pairs ($t_x$, tt) determined from a controlled vocabulary for the term of interest appearing as a term tt, wherein the term tt is a linguistic head of a term $t_x$ of the incongruous term pairs ($t_x$, tt); and
   annotating, by the computing device, the term of interest with a meaning provided by the controlled vocabulary only if a term $t_x$ of the incongruous term pairs ($t_x$, tt) including the term of interest as term tt in the data structure is not present within a predetermined textual distance of the term of interest in the text document.

2. The method of claim 1, wherein the term of interest is a head of a compound noun phrase.

3. The method of claim 1, wherein the term of interest is a known ambiguous word.

4. The method of claim 1, wherein the predetermined textual distance is less than one hundred and fifty characters.

5. The method of claim 1, wherein, for each incongruous term pair ($t_x$, tt), a semantic distance between the term $t_x$ and the term tt is greater than a threshold distance within the controlled vocabulary.

6. The method of claim 5, wherein the data structure comprising the incongruous term pairs ($t_x$, tt) is formed by:
   determining a plurality of compound noun phrases within the controlled vocabulary, wherein each compound noun phrase comprises a first term and a second term, wherein the second term is a linguistic head of the first term;
   for each compound noun phrase of the plurality of compound noun phrases, determining the semantic distance between the second term and the first term; and
   for each compound noun phrase wherein the semantic distance between the second term and the first term is greater than the threshold distance, saving the compound noun phrase in the data structure as an incongruous term pair ($t_x$, tt), wherein the second term is the term tt and the first term is the term $t_x$.

7. The method of claim 1, wherein annotations of the text document are provided in a data structure that is separate from the text document.

8. A computer-program product comprising:
   a non-transitory computer-readable medium storing executable instructions that, when executed by a computing device, causes the computing device to:
      determine a term of interest within a text document;
      search a data structure storing incongruous term pairs ($t_x$, tt) determined from a controlled vocabulary for the term of interest appearing as a term tt, wherein the term tt is a linguistic head of a term $t_x$ of the incongruous term pairs ($t_x$, tt); and
      annotate the term of interest with a meaning provided by the controlled vocabulary only if a term $t_x$ of the incongruous term pairs ($t_x$, tt) including the term of interest as term tt in the data structure is not present within a predetermined textual distance of the term of interest in the text document.

9. The computer-program product of claim 8, wherein the term of interest is a head of a compound noun phrase.

10. The computer-program product of claim 8, wherein the term of interest is a linguistic head of a compound noun phrase.

11. The computer-program product of claim 8, wherein the term of interest is a known ambiguous word.

12. The computer-program product of claim 8, wherein the predetermined textual distance is less than one hundred and fifty characters.

13. The computer-program product of claim 8, wherein, for each incongruous term pair ($t_x$, tt), a semantic distance between the term $t_x$ and the term tt is greater than a threshold distance within the controlled vocabulary.

14. A method of annotating a text document, the method comprising:
   determining, by a computing device, a plurality of ambiguous terms in a controlled vocabulary;
   for one or more ambiguous terms found in the controlled vocabulary, determining, by the computing device, term pairs ($t_x$, tt) containing the one or more ambiguous terms as target term tt, wherein terms $t_x$ are semantic context terms;
   searching, by the computing device, the text document for the plurality of ambiguous terms; and
   for each ambiguous term that is found in the text document:
      determining, by the computing device, if a semantic context term $t_x$ of the term pairs ($t_x$, tt) where the target term tt is the found ambiguous term is within a predetermined textual distance of the found ambiguous term in the text document; and
      annotating, by the computing device, the ambiguous term with a meaning of the target term tt as provided in the controlled vocabulary only if a semantic context term $t_x$ of the term pairs ($t_x$, tt) wherein the target term tt is the found ambiguous term is present within the predetermined textual distance of the found ambiguous term in the text document.

15. The method of claim 14, wherein the term pairs ($t_x$, tt) are determined for only ambiguous terms that are found in the text document.

16. The method of claim 14, wherein the term pairs ($t_x$, tt) are predetermined prior to searching the text document for the plurality of ambiguous terms.

17. The method of claim 14, wherein the plurality of ambiguous terms are determined by selecting terms within the controlled vocabulary having a scope note.

18. The method of claim 17, further comprising storing, in a data structure, each term having a scope note.

19. The method of claim 14, wherein the predetermined textual distance is less than one hundred and fifty characters.

20. A computer-implemented method of determining incongruous term pairs within a controlled vocabulary, the method comprising:
- determining by a computing device, a plurality of compound noun phrases within the controlled vocabulary, wherein each compound noun phrase comprises a first term and a second term, wherein the second term is a linguistic head of the first term;
- for each compound noun phrase of the plurality of compound noun phrases, determining, by a computing device, a semantic distance between the second term and the first term; and
- for each compound noun phrase wherein the semantic distance between the second term and the first term is greater than a threshold distance, saving the compound noun phrase in a data structure as an incongruous term pair.

* * * * *